June 26, 1917.

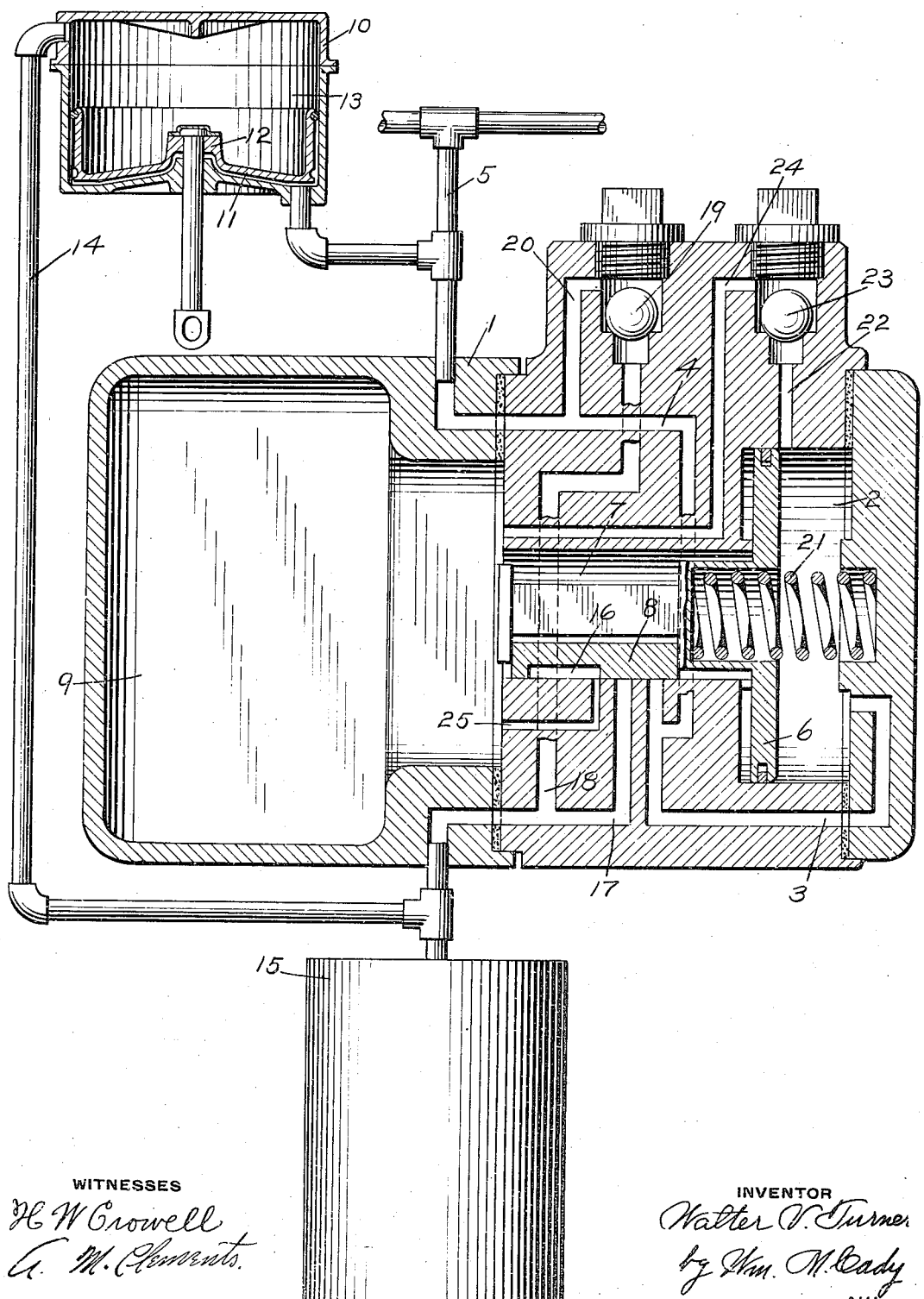

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

RELEASE-VALVE FOR VACUUM-BRAKES.

1,230,953.

Specification of Letters Patent.  Patented June 26, 1917.

Application filed November 2, 1915. Serial No. 59,169.

*To all whom it may concern:*

Be it known that I, WALTER V. TURNER, a citizen of the United States, residing at Wilkinsburg, in the county of Allegheny and State of Pennsylvania, have invented new and useful Improvements in Release-Valves for Vacuum-Brakes, of which the following is a specification.

This invention relates to automatic vacuum brakes, and more particularly to a valve device for controlling the application and release of the brakes.

In releasing the brakes where an automatic vacuum brake apparatus is employed, fluid from all the brake cylinders throughout the train must be exhausted through the vacuum brake pipe. This results in a slow release of the brakes, particularly where several cars are connected up in the train.

The principal object of my invention is to provide a vacuum brake having means for insuring a quick release of the brakes.

In the accompanying drawing, the single figure is a view of a car vacuum brake equipment with my improvement applied thereto, the brake cylinder and the release valve mechanism being shown in section.

According to my invention, a release valve mechanism is provided, comprising a casing 1 having a piston chamber 2 connected by passages 3 and 4 to the vacuum brake pipe 5 and containing a piston 6.

Within a valve chamber 7 is contained a slide valve 8, adapted to be operated by the piston 6, the valve chamber being open to a chamber 9 so as to provide a larger volume.

The usual vacuum brake cylinder 10 has the chamber 11 at one side of the brake piston 12 connected to the vacuum brake pipe 5, and the chamber 13 at the opposite side is connected by pipe 14 to a vacuum chamber 15.

In operation, fluid is pumped out of the brake pipe 5 by means of the usual ejector apparatus on the locomotive, and fluid is also exhausted from piston chamber 2 through passages 3 and 4. The pressure in piston chamber 2 being reduced, the atmospheric pressure in valve chamber 7 and chamber 9 operates to shift the piston 6 outwardly, so that slide valve 8 is moved to a position in which passage 3 is connected through cavity 16 with a passage 17 leading to the vacuum chamber 15 and also with a passage 25 leading to chamber 9. The pressure in chamber 9 is thus reduced and at the same time fluid is being exhausted from vacuum chamber 15 through passages 17 and 18 past check valve 19 to a passage 20 opening into passage 4. When the desired degree of exhaustion is effected, the pressures being equal on the opposite sides of piston 6, the spring 21 moves the piston and the valve 8 back to normal position, as shown in the drawing. The various chambers and the brake cylinder are now under a partial vacuum and if it is desired to effect an application of the brakes, fluid is admitted to the vacuum brake pipe and flows to the chamber 11 of the brake cylinder on each car. Since the chamber 13 at the opposite side of the brake piston still contains a partial vacuum, the brake piston is operated by the fluid pressure admitted to chamber 11 and an application of the brakes is effected. Fluid supplied to the brake pipe can also flow through passages 4 and 3 to piston chamber 2 and thence through passage 22 past check valve 23 to a passage 24 which leads to chamber 9. The pressure on opposite sides of piston 6 is thus increased as the brake pipe pressure increases and the piston 6 remains in normal position. The vacuum chamber 15, however, is cut off from the brake pipe and the other chambers at this time, so that the partial vacuum is maintained therein.

If it is desired to release the brakes, the vacuum brake pipe pressure is reduced and as the pressure in piston chamber 2 is correspondingly reduced, the piston 6 is shifted outwardly by the pressure in chamber 9, so that the valve 8 connects passage 17 with passage 3. Since there is a partial vacuum in chamber 15, it is evident that fluid from the brake pipe will equalize into said chamber and thereby quicken the rate of reduction in brake pipe pressure.

The rapid equalization of pressures on opposite sides of the brake piston follows, so that the brakes are quickly released.

After equalization of the pressure in chamber 15 with that in the brake pipe, further reduction in brake pipe pressure is continued by the usual operation of the ejector apparatus on the engine. Since passage 25 connects chamber 9 with passage 3 in this position, the pressure in chamber 9 is reduced by flow to the brake pipe and upon substantial equalization of fluid pressures on opposite sides of piston 6, the piston is moved back to normal position by the spring 21.

Having now described my invention, what I claim as new and desire to secure by Letters Patent, is:

1. In an automatic vacuum brake apparatus, the combination with a brake pipe normally maintained under a partial vacuum, and a brake cylinder for applying the brakes upon an increase in pressure in the brake pipe, of a chamber having a passage leading to the brake pipe and containing a check valve and normally maintained at a partial vacuum, a valve, and a piston operated upon an increase in brake pipe pressure for operating said valve to connect said chamber with the brake pipe.

2. In an automatic vacuum brake apparatus, the combination with a brake pipe normally maintained under a partial vacuum, and a brake cylinder for applying the brakes upon an increase in pressure in the brake pipe, of a chamber normally containing a partial vacuum, a valve, a piston subject to the opposing pressures of the brake pipe and a chamber, a passage controlled by the movement of said piston for equalizing the brake pipe pressure into said chamber upon increasing the brake pipe pressure to effect an application of the brakes, said valve being operated by said piston upon a reduction in brake pipe pressure in releasing the brakes for connecting the vacuum chamber with the brake pipe.

In testimony whereof I have hereunto set my hand.

WALTER V. TURNER.